US009510051B1

(12) United States Patent
Bostick et al.

(10) Patent No.: US 9,510,051 B1
(45) Date of Patent: Nov. 29, 2016

(54) POP-UPS FOR VIDEO SUGGESTIONS BASED ON SOCIAL MESSAGES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/939,027

(22) Filed: Nov. 12, 2015

(51) Int. Cl.
| | |
|---|---|
| H04N 7/10 | (2006.01) |
| H04N 7/025 | (2006.01) |
| G06F 3/00 | (2006.01) |
| G06F 13/00 | (2006.01) |
| H04N 5/445 | (2011.01) |
| H04N 21/466 | (2011.01) |
| H04N 21/431 | (2011.01) |
| H04N 21/441 | (2011.01) |
| H04N 21/45 | (2011.01) |
| H04N 21/458 | (2011.01) |
| H04N 21/442 | (2011.01) |

(52) U.S. Cl.
CPC ...... H04N 21/4668 (2013.01); H04N 21/4316 (2013.01); H04N 21/441 (2013.01); H04N 21/44204 (2013.01); H04N 21/458 (2013.01); H04N 21/4532 (2013.01); H04N 21/4662 (2013.01); H04N 21/4667 (2013.01)

(58) Field of Classification Search
CPC .............. H04N 21/44218; H04N 21/466; H04N 21/4668; H04N 21/472; H04N 21/4826; H04N 5/45

USPC ......... 725/32, 34, 37, 39, 40, 41, 43, 46, 61
See application file for complete search history.

(56) References Cited

U.S. PATENT DOCUMENTS

| | | |
|---|---|---|
| 5,822,123 A | 10/1998 | Davis et al. |
| 8,510,778 B2 | 8/2013 | Craner et al. |
| 8,745,666 B1 | 6/2014 | Zaveri |
| 9,247,300 B2 | 1/2016 | Oddo et al. |

(Continued)

FOREIGN PATENT DOCUMENTS

WO 0195223 A2 12/2001

OTHER PUBLICATIONS

U.S. Appl. No. 14/845,479, filed Sep. 4, 2015, Entitled "Event Pop-Ups for Video Selection".

(Continued)

*Primary Examiner* — Kyu Chae
(74) *Attorney, Agent, or Firm* — Isaac J. Gooshaw

(57) ABSTRACT

A method, computer program product and computer system is provided. A processor identifies an identity of a viewer of a display device, where the display device is displaying a first video feed. A processor retrieves a profile of the viewer, where the profile includes a plurality of preferences of the viewer. Responsive to a determination that a content of a second video feed that is available for viewing on the display device matches at least one of the plurality of preferences of the viewer, a processor displays an overlay of the second video feed on top of the first video feed. A processor identifies an acknowledgment made by the user regarding the overlay. A processor updates the overlay based, at least in part on, the acknowledgment made by the user.

14 Claims, 6 Drawing Sheets

(56) References Cited

U.S. PATENT DOCUMENTS

| | | | |
|---|---|---|---|
| 2002/0157101 | A1 | 10/2002 | Schrader et al. |
| 2003/0023977 | A1 | 1/2003 | Brown et al. |
| 2003/0163817 | A1 | 8/2003 | Han |
| 2004/0003395 | A1* | 1/2004 | Srinivas ............... H04N 5/445 725/34 |
| 2004/0148636 | A1 | 7/2004 | Weinstein et al. |
| 2010/0169905 | A1* | 7/2010 | Fukuchi ............ H04N 21/4668 725/10 |
| 2012/0030587 | A1 | 2/2012 | Ketkar |
| 2012/0047529 | A1 | 2/2012 | Schultz et al. |
| 2012/0210268 | A1 | 8/2012 | Hilbrink et al. |
| 2013/0006765 | A1 | 1/2013 | Lee |
| 2013/0041747 | A1 | 2/2013 | Anderson et al. |
| 2013/0332962 | A1* | 12/2013 | Moritz ............... H04N 21/2407 725/46 |
| 2014/0123178 | A1 | 5/2014 | Burkitt et al. |
| 2014/0282745 | A1 | 9/2014 | Chipman et al. |
| 2014/0325556 | A1 | 10/2014 | Hoang et al. |
| 2015/0082330 | A1* | 3/2015 | Yun ..................... H04N 21/233 725/14 |
| 2015/0234820 | A1 | 8/2015 | Arvamudan |
| 2016/0029054 | A1 | 1/2016 | Waisanen et al. |

OTHER PUBLICATIONS

Appendix P.: List of IBM Patents or Patent Applications Treated as Related, Filed Herewith, 2 pages.

Betters, Elyse; "Google Chromecast tips: Ten ways to enhance your streaming experience"; Pocket-lint; Jul. 5, 2014; © Pocket-lint ltd, 2003-2015; pp. 1-7; <http://www.pocket-lint.com/news/129736-google-chromecast-tips-tenways-to-enhance-your-streaming-experience>.

IBM; "Method and System for Mobile Viewing Preference Transport"; An IP.com Prior Art Database Technical Disclosure; Original Publication Date: Aug. 27, 2003; IP.com No. 000019047; IP.com Electronic Publication: Aug. 27, 2003; pp. 1-2.

IBM et al., "Personal Television Schedule Service", An IP.com Prior Art Database Technical Disclosure, Original Publication Date: Aug. 1, 1996, Original Disclosure Information: TDB v39 n8 08-96, pp. 237-244, IP.com No. 000118056, IP.com Electronic Publication: Mar. 31, 2005, vol. 39, No. 08, Aug. 1996.

Price, Mark, "Why personalization of your TV experience will be awesome", VentureBeat, Feb. 7, 2013, 12:00 PM, 9 pages, <http://venturebeat.com/2013/02/07/why-personalized-tv-will-be-awesome/>.

Ribiere et al.; "Progressive display of user interests"; An IP.com Prior Art Database Technical Disclosure; Original Publication Date: Feb. 11, 2008; IP.com No. 000167391; IP.com Electronic Publication: Feb. 11, 2008; Copyright: © 2007 Motorola et al., Inc.; 6 pages.

Tobi Pro Global, "Advertising research and eye tracking"; Copyright © 2015, Tobii AB (publ); Printed on: May 28, 2015; pp. 1-5.

Warzel, Charlie, "BreakingNews Introduces Smart TV News Ticker", Adweek, Apr. 18, 2012, 12:23 PM, 3 pages, <http://www.adweek.com/news/technology/breakingnews-introduces-smart-tv-news-ticker-139672>.

"Azuki Systems is now part of Ericsson", provided in the main idea of disclosure dated Aug. 18, 2014, 2 pages, <http://www.ericsson.com/ourportfolio/azuki-landingpage>.

"Building a Smart Online Video Application", Dr. Dobb's, Dec. 1, 1997, pp. 1-8, Copyright © 1997, Dr. Dobb's Journal, <http://www.drdobbs.com/web-development/building-a-smart-online-video-applicatio/184410343>.

"Scrolling News Crawl Software for TV Broadcast", TV-Ticker, © Worldflash Software, Inc. 1998-2010, Downloaded from TV-Ticker, Downloaded from the Internet on Mar. 2, 2015, 3 pages, <http://tvticker.worldflash.com/>.

"Technique for end to end personalized and interactive marketing on Television", An IP.com Prior Art Database Technical Disclosure, Authors et. al.: Disclosed Anonymously, IP.com No. 000236959, IP.com Electronic Publication: May 23, 2014, pp. 1-5.

"Event Pop-Ups for Video Selection", U.S. Appl. No. 15/080,788, filed Mar. 25, 2016.

IBM Appendix P, list of IBM patents or patent applications treated as related, pp. 1-2.

* cited by examiner

POP-UPS FOR VIDEO SUGGESTIONS BASED ON SOCIAL MESSAGES

BACKGROUND OF THE INVENTION

The present invention relates generally to the field of video distribution interfaces, and more particularly to display interfaces to facilitate video program or channel selection.

As more video content is produced, successfully identifying content that is acceptable by a viewer often becomes increasingly difficult. Originally, printed program guides listed content that was scheduled for broadcast. More recently, program guides have become interactive, providing a graphical user interface (GUI) for browsing. Additionally, in addition to future scheduled content, interactive program guides can also include indications of which content or programs are currently being broadcasted. However, in both printed and interactive guides a user must actively examine content within the guide to know what is being offered.

SUMMARY

Embodiments of the present invention provide a method, computer program product, and computer system to display video overlays to a viewer of content relevant to the viewer's interests. A processor identifies an identity of a viewer of a display device, where the display device is displaying a first video feed. A processor retrieves a profile of the viewer, where the profile includes a plurality of preferences of the viewer. Responsive to a determination that a content of a second video feed that is available for viewing on the display device matches at least one of the plurality of preferences of the viewer, a processor displays an overlay of the second video feed on top of the first video feed. A processor identifies an acknowledgment made by the user regarding the overlay. A processor updates the overlay based, at least in part on, the acknowledgment made by the user.

DETAILED DESCRIPTION

Figure 1:
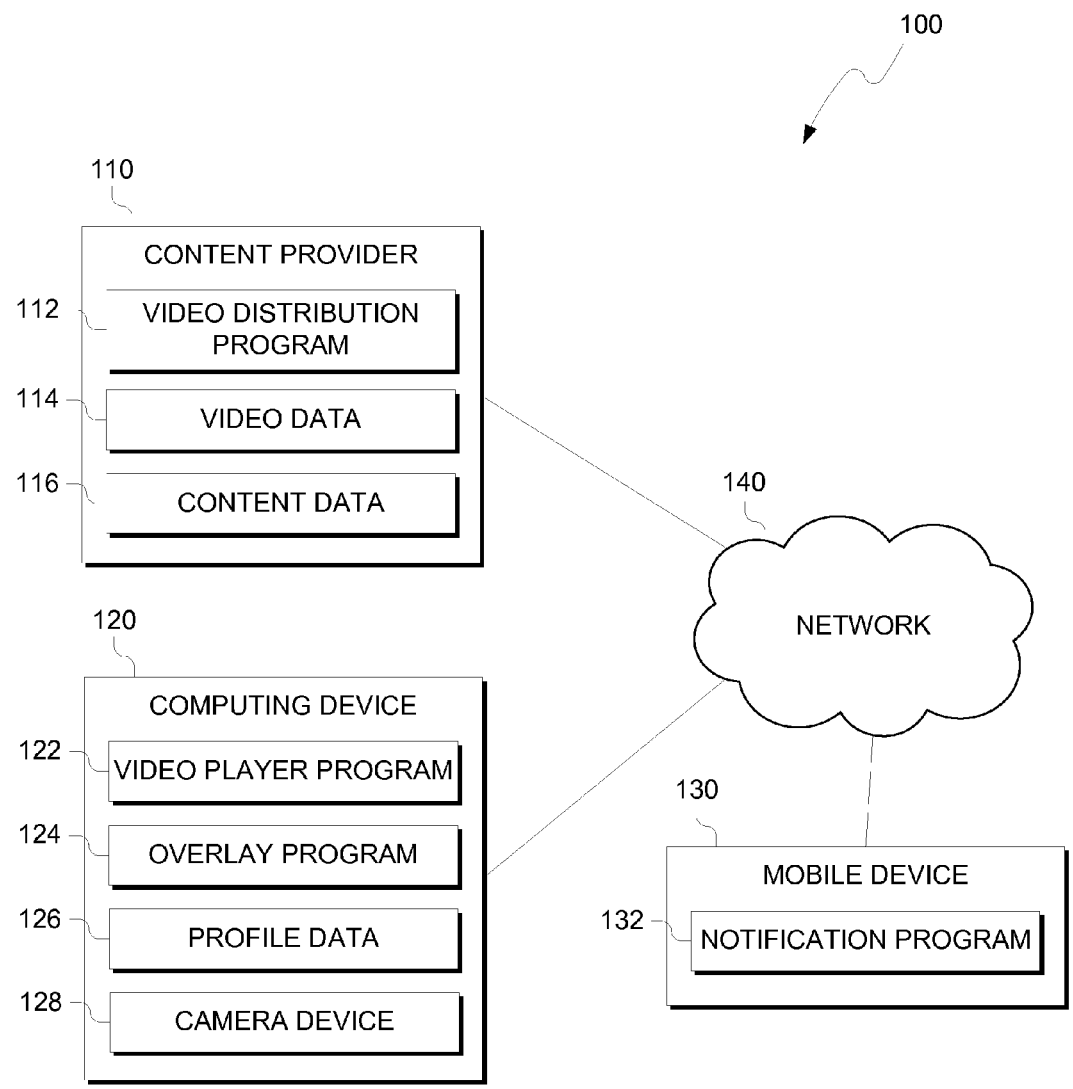
FIG. 1 is a functional block diagram illustrating a video distribution environment, in accordance with an embodiment of the present invention.

While solutions to presenting information regarding programming of a television broadcast system are known, they are passive in that they do not notify a user when relevant content becomes available on a stream or channel of the television broadcast system. Many set-top boxes include channel guides to present the content offered, however such solutions require a user to actively search for content they would like to view. Embodiments of the present invention recognize that by collecting information regarding a user, a profile can be generated to reflect the interests of the user. Additionally, information describing content provided by the television broadcast system can be determined. When a match between the broadcasted content and the preferences indicated by the profile of the user occurs, a picture-in-picture (PIP) preview of the matching content is displayed to the user. By displaying the PIP preview to a user when content matching the preferences of the user is currently or will be broadcasted, content matching the interests can be suggested to the user with a reduced degree of input from the user when compared to passive solutions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating video distribution environment, generally designated 100, in accordance with one embodiment of the present invention. Video distribution environment 100 includes content provider 110 computing device 120, and mobile device 130 connected over network 140. Content provider 110 includes video distribution program 112, video data 114 and content data 116. Computing device includes video player program 122, overlay program 124, profile data 126, and camera device 128. Mobile device 130 includes notification program 132. In general, as described herein, video player program 122 operates in conjunction with overlay program 124 to i) predict which content a user may wish to view and ii) to make that content known to the user such that the user is provided an opportunity to view the content if so desired.

In various embodiments of the present invention, content provider 110 and computing device 120 are each a computing device that can be a standalone device, a server, a laptop computer, a tablet computer, a netbook computer, a personal computer (PC), or a desktop computer. In another embodiment, content provider 110 or computing device 120 each represent a computing system utilizing clustered computers and components to act as a single pool of seamless resources. In general, content provider 110 and computing device 120 can be any computing device or a combination of devices with access to video data 114, content data 116, profile data 126, and camera device 128 and is capable of executing video distribution program 112, video player program 122, overlay program 124, and notification program 132. Content provider 110, computing device 120, and mobile device 130 may each include internal and external hardware components, as depicted and described in further detail with respect to FIG. 3.

In this exemplary embodiment, video distribution program 112, video data 114 and content data 116 are stored on content provider 110. Video player program 122, overlay program 124, and profile data 126 are stored on computing device 120. Camera device 128 is a component of computing device 120. Notification program 132 is stored on mobile device 130. However, in other embodiments, video distribution program 112, video data 114, content data 116, video player program 122, overlay program 124, profile data 126, camera device 128, and notification program 132 may be stored externally and/or accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between content provider 110, computing device 120, and mobile device 130, in accordance with a desired embodiment of the present invention.

In various embodiments, content provider 110 includes video distribution program 112 that sends video data 114 to one or more users. Video data 114 includes one or more prerecorded videos, such as video-on-demand, or live feeds, such as broadcast channels. Computing device 120 includes video player program 122 that receives video data 114 for display to a user. In some embodiments, computing device 120 is a set-top box or other device connected to a display, such as a television. In other embodiments, computing device 120 includes a display, such as a smart television (TV) or smartphone. Video player program 122 receives input from a user of computing device 120 to view content of video data 114. For example, a user changes channels or selects a video offered by an on-demand service provided by content provider 110.

As an example scenario of video content distribution, content provider 110 is operated by a cable company offering a variety of channels (e.g., video data 114) to customers. The cable company distributes a feed of all the channels to the customers. The customers each have a set-top box (e.g., computing device 120) for viewing the channels offered by the cable company. The set-top box receives input from a user to select a channel for viewing. The set-top box filters the feed to select the desired channel and sends to a video signal of the channel to a connected television for display. In this example, video data 114 is broadcasted to computing device 120, with computing device 120 determining the content to display. In other scenarios, video data 114 selectively sends to computing device 120. For example, content provider 110 is an internet protocol television (IPTV) provider or other server sending packets of information containing video data 114. One of ordinary skill in the art will appreciate that any system of content distribution may be used by a provider without deviating from the invention. Additionally, while not shown for simplicity, more than one content provider may be connected to network 140. Video player program 122 of computing device 120 is configured to receive the respective video data 114 of each content provider 110 as discussed herein. In some embodiments, content provider 110 acts as an intermediary for a content producer. For example, a broadcast television channel sends a live broadcast to content provider 110. Content provider 110 sends the broadcast to computing device 120. In such embodiments, content provider 110 may not store video data 114 and content data 116 locally and receive the data from a content producer for distribution.

In various embodiments, content provider 110 includes content data 116. Content data 116 describes the content of video data 114. For example, content data 116 includes the name of the actors in a movie offered in video data 114. Additionally, content data 116 includes events that occur in video data 114. For example, content data 116 includes a large event in a television series offered in video data 114. In various embodiments, content data 116 includes, but is not limited to, metadata describing the content; popularity metrics of the content; and event data of the content, such as the timing and types of events that occur during the content.

Example metadata includes actors in a movie or show; players or teams in a game; the genre of a movie or show; the type of sport being played; the number of an episode in a season (e.g., season premier or finale); and the time in a season of a game (e.g., an opening game or end of season playoffs). Example popularity metrics include a number of users currently viewing or has viewed the content; a user rating of the content; and other editorial scores or reviews from external sources. Example event data includes events that occur during the content. For example, event data includes a fight in an action movie along with the combatants in the fight. As another example, event data includes an event for a home run and who hit the home run. Additionally, content data 116 includes the timing of said events in the content. For pre-recorded or delayed content, the timing of the events is included in content data 116. For example, the time the fight occurs in the playback of the action movie. For live or broadcast content, event data is entered as a stream with the timing of the event set to when the event was entered in content data 116. One of ordinary skill in the art will appreciate that any information describing the content of a piece of video data 114 may be used without deviating from the invention. By providing the events presented in the content of content provider 110, users can be notified of relevant events when they will occur either in live content or pre-recorded content.

In some embodiments, a content producer or an administrator of content provider 110 provides content data 116 for content supplied to content provider 110. For example, the content producer provides metadata about a piece of pre-recorded content (e.g., actors, the characters the actors play and the genre of movie) in addition to events and timing of said events that take place in the content (e.g., a romantic moment occurs between a first character and second character at the thirty-five minute mark in a movie). For a live content, a content producer or an administrator of content provider 110 provides content data 116 for events as they occur. For example, the current score is updated when a scoring event occur in a sports game. As another example, a player list is updated when a substitution occurs in a sports game. In some scenarios, content data 116 is included in video data 114 (e.g., metadata is included in a video stream of video data 114). In some embodiments, overlay program 124 retrieves content data 116 as the data becomes available. In an embodiment, overlay program 124 retrieves a subset of content data 116. For example, overlay program 124 receives preferences from a user, such as particular programs or channels the user wishes to be given PIP overlays when the particular programs or channels are available. In response, overlay program 124 retrieves only content data 116 that match the preferences of the user.

In other embodiments, video distribution program 112 analyzes content in video data 114 to determine content data 116. For example, video distribution program 112 performs facial recognition to determine actors in a movie or players in a game. Additionally, video distribution program 112 performs event-based analysis of a video to determine the events contained in said video. For example, video distribution program 112 includes additional video content describing a plurality of reference videos of certain types of events (one clip for a first fight between two people and another clip for a dance routine between two people). Video distribution program 112 compares the reference videos to content in video data 114. When a match between a reference video and content in video data 114 is determined, video distribution program 112 generates content data using the description of the reference video as a template. Such as, if a dance routine is detected, video distribution program 112 creates a dance event and inserts the names of the actors, where the actors are determined based on the facial recognition discussed herein. By automatically determining events and descriptors of the events, such embodiments provide mechanisms for determining content that has yet to be identified manually. In another embodiment, video player program 122 determines events for one or more pieces of content in received video data 114. For example, video player program 122 receives input from a user to monitor a channel. While watching other content, video player program 122 automatically determines content for the monitored channel as similarly discussed with regards to video distribution program 112 performing event-based analysis to video content.

In various embodiments, computing device 120 includes overlay program 124. Overlay program 124 determines if preferred content is currently available in video data 114 by content provider 110. Overlay program 124 retrieves content data 116 from content provider 110. When content matches preferences or viewing habits for a user, overlay program 124 displays an overlay on top of the currently displayed video data 114 (e.g., the broadcast channel or an on-demand video currently being viewed). The overlay includes video data 114 from the matching content (e.g., a broadcast channel or video on demand not currently being watched and that matches the preferences or viewing habits of a user). As such, overlay program 124 creates a picture-in-picture (PIP) view of the suggested content overlaid onto the currently viewed video data 114. For example, a broadcasted channel is currently playing a sporting game, while a user is watching a video on-demand. The user has a preference to a particular player on a team playing in the match. Content data 116 indicates that during the live feed the sporting match the favorite player of the user was just substituted onto the field. By comparing the preferences of the user and the content of the sporting game, overlay program 124 displays a live overlay from the broadcast channel showing the sporting game.

In some scenarios, a live stream from a broadcast channel has a built in delay from the captured event occurring to when it is viewable. Overlay program 124 sends begins displaying the overlay earlier than the delay of the stream to alert the viewer of the upcoming live event on the channel, such that the PIP view displays the live stream when the matching event occurs within the overlay. In other scenarios, video player program 122 buffers or stores the incoming live stream when an overlay stream is displayed. If a user provides a positive acknowledgment, i.e. selection, to view the stream matching the user's preferences, video player program 122 switches displayed video data 114 with the selected preview in the PIP view.

In some embodiments, overlay program 124 displays more than one matching video data 114. Overlay program 124 determines a ranking score for each available channel or video of video data 114. Based on the ranking score, overlay program 124 displays more than one matching video data 114 in an order. For example, a user may have a high preference for one team and a lower preference for another team. Overlay program 124 displays the broadcast of the more preferred team first in an overlay list of PIP views, with the broadcast of the lesser preferred team afterwards.

In various embodiments, computing device 120 includes profile data 126. Profile data 126 includes one or more profiles of users of computing device 120. In some embodiments, when a user starts video player program 122 to watch video data 114 of a content provider 110, video player program 122 prompts the user to select the corresponding profile of the user. In other embodiments, computing device 120 provides authentication mechanisms to determine the user or users of computing device 120. For example, computing device 120 includes sensors to detect the identities of the users viewing the display of computing device 120, such as a camera for facial recognition. The camera takes images of the users viewing the display. Overlay program 124 determines the identities of the users by performing facial recognition on the images taken from the camera, comparing said images from the camera to images of the users stored in the relevant profiles of profile data 126.

In various embodiments, computing device 120 includes camera device 128. In some scenarios, camera device 128 provides images for identification and authentication of a user, as discussed herein. In other scenarios, camera device 128 captures eye movements of the user while viewing video data 114 and any PIP overlays displayed by overlay program 124. In various scenarios, overlay program 124 receives captured images from camera device 128 to perform eye tracking of a user. Based on the eye tracking, overlay program 124 determines where on a display a user is currently viewing. Specifically, overlay program determines if a user is viewing a displayed PIP overlay and for how long. Based on the eye movements of a user view displayed video data 114 and duration, overlay program 124 updates the PIP overlays. In one example, if a user quickly views a PIP overlay but the looks back at the area of the currently displayed video data 114 of video player program 122, then overlay program 124 removes the PIP overlay from display. In some instances, overlay program 124 replaces the PIP overlay with matching video data 114 from another broadcast channel or video on-demand. In other instances, overlay program 124 removes the PIP overlay for a predetermined amount of time or until another matching video data 114 is identified.

In various embodiments, profile data 126 includes preferences of user of video player program 122. Preferences include information indicating preferred content the user wants to receive PIP overlays from overlay program 124 when relevant video data 114 is accessible by video player program 122 (e.g., video data 114 is retrievable from content provider 100 at the current viewing of other video content via video player program 122 by the user). Each profile includes preferences such as, but not limited to, preferred genres of movies or shows; preferred subjects or topics; preferred game types; preferred shows, networks, channels, or other types of content producers; preferred teams or players in a team; preferred hometown or location of teams; or preferred event types or situations (e.g., a fight scene or romantic moment in a movie). In some embodiments, a profile in profile data 126 includes the viewing habits of the user. Viewing habits includes information regarding the type of content for video data 114 the user often views, or other habits or interactions the user has when viewing content. Each profile includes viewing habits such as, but not limited to, the amount of time each type of content is previously viewed by a user (e.g., watches comedies more than dramas); frequency of content previously viewed (e.g., often watched shows or portions of shows, such as the opening theme song); or frequency of metadata in content previously viewed (e.g., favorite actor in shows watched).

In some embodiments, overlay program 124 learns the viewing habits of a user. Based on viewed video data 114 by a user, overlay program 124 stores preferred or undesirable content, i.e. content preferences, in a profile of the user in profile data 126. As a user views a video via video player program 122, overlay program 124 stores the content data 116 associated with the video as part of a profile of that user. As similar content in content data 116 is viewed by the user, overlay program 124 assigns a larger weight or score to that type of content. As different videos or broadcasts of video data 114 with similar content data 116 is watched by a user, profile data 126 includes a larger weight or score to the content data 116 shared with the different videos. In some scenarios, overlay program 124 assigns a weight or score to viewing habits of particular content of video data 114 based on the time the video is watched. For example, in one scenario and embodiment, if a video is viewed for only a few seconds (e.g., the user is searching through channels for content), then overlay program 124 does not increase the weight of score of the content that the user viewed for a time period that is less than a threshold. For example, if a particular content was viewed for less than one minute, then overlay program 124 determines that the weight of score of the content is not to be increased. In one scenario and embodiment, if a user watches a video or broadcast for a longer period (e.g., above the threshold or for a majority of the runtime of the content), then overlay program 124 determines that an increase the weight or score for that type of content is to be made and makes that increase accordingly. In some scenarios and embodiments, if a user views a particular content for more than a few seconds, but less than the a predetermined amount (e.g., a threshold of a few minutes), then overlay program 124 determines that the user has viewed the content, but found that content to be undesirable. As such, in one scenario and embodiment, overlay program 124 decreases the weight or score associated with content of a video that the user watched for a limited time. In another scenario and embodiment, overlay program 124 is configured to decrease the weight for content that was not watched after a pre-defined period of time. In one example, scores or weights for content are degraded at a rate over a period of time. As such, if a user does not view a particular content or type of content, which increases their weight or score, then their weight or score decreases accordingly. In one scenario and embodiment, such a degradation process favors more recently viewed content with a weight or score that is greater when the number of times content has been viewed is taken into account. For example, a first content has been viewed twice as often as a second content. However, the first content has not been viewed in six months whereas the second content was viewed many times over the last month. As such, the second content has a score that is greater than the first content, even though the first content was viewed more times than the second content.

In another example and embodiment, overlay program 124 is configured to lower a weight or score of a user-provided preference if the user has not viewed video data 114 with a type of content addressed by the user-provided preference. In some scenarios and embodiments, if a user has set up a user-provided preference but their viewing habits indicate a contrary preference to that indicated by the user-provided preference, then overlay program 124 determines that the user-provided preference is no longer valid. In some such scenarios and embodiments, overlay program 124 prompts the user to update the preference if i) a score of a user-provided preference is below a threshold, or ii) if the viewing habits of the user contradict the indicated preference. As such, overlay program 124 learns the current viewing habits of the user based on the viewing habits of the user.

In some embodiments, profile data 126 includes social network information regarding the user such as social networks the user belongs to and the profiles of other friends of the user within the social networks. Overlay program 124 retrieves posts made by friends of the user to determine if the posts contain information regarding content offered in video data 114. For example, overlay program 124 retrieves posts describing shows or games, or even actors or members of teams. As the frequency of posts including similar content increase (e.g., more posts describe a certain show), overlay program 124 includes messages when the content becomes available in video data 114 (e.g., next time the show airs). In some embodiments, profile data 126 includes social network information to follow certain other users of the social network. One skilled in the art recognizes that a user can follow another user for a variety of reasons. In general, a user follows another user because they gain a benefit by doing so. A user follows another member, i.e. another user, of the social network because, as not limiting examples, they both share similar interests and the other member is more knowledgeable about content provided by content provider 110. When a followed user posts information regarding content, overlay program 124 provides messages to the user when the content mentioned by the followed user becomes available. By collecting the preferences of a user, and other with similar interest, overlay program 124 can provide messages indicating when content of video data 114 is available that matches said preferences. As such, the user is more aware of content that is similar to the interests instead of manually discovering the content themselves.

In some embodiments, social network information includes posts made by other users on the social network. In some scenarios, social network information includes messages posted by friends of the user. Content of the messages posted by friends of the user, in some instances, are used by overlay program 124 to confirm preferences of the user. For example, if a user posts messages about one topic and friends of the user post similar messages about the same topic, then overlay program 124 determines the content is a strong preference of the user. In other scenarios, social network information includes groups the user belongs to on the social network. Overlay program 124 determines the content of messages posted by members of the groups and determines if, as a whole, members of the group share preferences for different types of content. For example, if over half of the posts for a given time period relate to a new show or a particular actor, then overlay program 124 creates a preference for the new show or actor for the user. In another scenario, social network information includes content the user has approved of. For example, many social networks includes a "like" or similar functionality associated with posted messages. A "like" indicates approval by a user of the content of the message. Overlay program 124 places more weight or emphasis for content in messages "liked" by a user. Furthermore, overlay program 124 places more weight or emphasis for content in messages "liked" by a members of a group the user belongs to.

In some embodiments, profile data 126 includes previous responses to PIP overlays displayed by overlay program 124. For example, if overlay program 124 receives input from a user indicating the user would like to view the content associated with the a particular PIP overlay, then overlay program 124 stores in the profile of the user in profile data 126 information indicating the approval by the user (e.g., that the video in the PIP overlay was relevant to the user's interests). If overlay program 124 receives input from a user indicating the user would not like to view the content associated with the PIP overlay, then overlay program 124 stores in the profile of the user in profile data 126 information indicating the disapproval by the user (e.g., the video data 114 displayed in the PIP overlay was not relevant to the user's interests). By storing previous responses, overlay program 124 can train the preferences of profile data 126 for a user to match the relevant interests of the user.

In an embodiment, profile data 126 includes user-designated preferences. For example, overlay program 124 receives input from the user to provide PIP overlays when certain content is present in video data 114, as discussed herein. In some embodiments and scenarios, a user provides identifying formation (for example, a name) for specific individuals or groups of individuals, which are then included as part of profile data 126. In some embodiments and scenarios, a user provides preferences for content that the user does not prefer. In response to the identification of such content that matches such criteria, overlay program 124 does not generate PIP overlays for video content containing the non-preferred, i.e. disliked, content.

In some embodiments, mobile device 130 receives notifications from computing device 120 regarding events or the availability of video data 114 that matches the preferences of a user. In some embodiments and scenarios, overlay program 124 sends a notification to notification program 132 such as a line of text detailing the event of available video data 114. For example, if a favorite team of a user is about to start a game, then overlay program 124 sends a message to notification program 132. In some embodiments and scenarios, in response, notification program 132 displays a notification to the user of mobile device 130 of the game (e.g., "A game with Team A is about to start."). As such, in some embodiments and scenarios, even though a user is away from computing device 120 that user still receive notifications of video data 114 with content matching preferences of that user.

In some embodiments, mobile device 130 includes a video player program (not shown). The video player of the mobile device and video player program 122 can communicate via network 140. In some scenarios, when a user is viewing video data 114 on mobile device 130 and connects to network 140, video player program 122 begins playing the same video data 114 currently viewed on the mobile device. In another scenario, the video player program of mobile device sends instructions to video player program 122 to begin displaying the currently viewed on the mobile device on a display device connected to computing device 120.

In various embodiments, overlay program 124 determines the preferences, either liked or disliked, for each user based on one or more of: (i) the user's social network profile or profiles; (ii) profiles of users who are friends with or otherwise connected within the social network the user is a member of; (iii) viewing habits or past interactions with video player program 122; (iv) previous responses by the user to PIP overlays generated by overlay program 124; and (iv) user-designated preferences. In some embodiments, overlay program 124 determines the preferences of a user. In other embodiments, overlay program 124 receives the preferences from another program or module (not shown) connected to network 140. As such, overlay program 124 learns the viewing habits and of preferences of a user over time, storing such information in a profile associated with the user in profile data 126. Based on a profile of the user, overlay program 124 suggests other video data 114 not currently being viewed but available to a user. When content data 116 of the available video data 114 matches the viewing habits or preferences as indicated in a profile of the user, then overlay program 124 displays a PIP overlay of the video data 114 that matches the user's viewing habits or preferences.

While video data 114 has been discussed, one of ordinary skill in the art would appreciate that other types of media may be provided by content provider 110 without deviating from the invention. For example, content provider 110 is a radio provider, either terrestrial or satellite based. A skilled artisan will see the similarities between the stations of a radio content provider and the channels of a television content provider. Similarly the content of the radio stations can be determined or provided (e.g., metadata with artists with songs, program schedules, etc.). As such, embodiments of the present invention may also provide similar preview streams of radio when preferences of a listener matches the content on another station. Computing device 120 includes an audio player program for a user to select stations from the content provider or content providers. When another station is offering audio content matching preferences of the user, then audio player program may switch to the station or provide a notification of the audio content.

Figure 2:
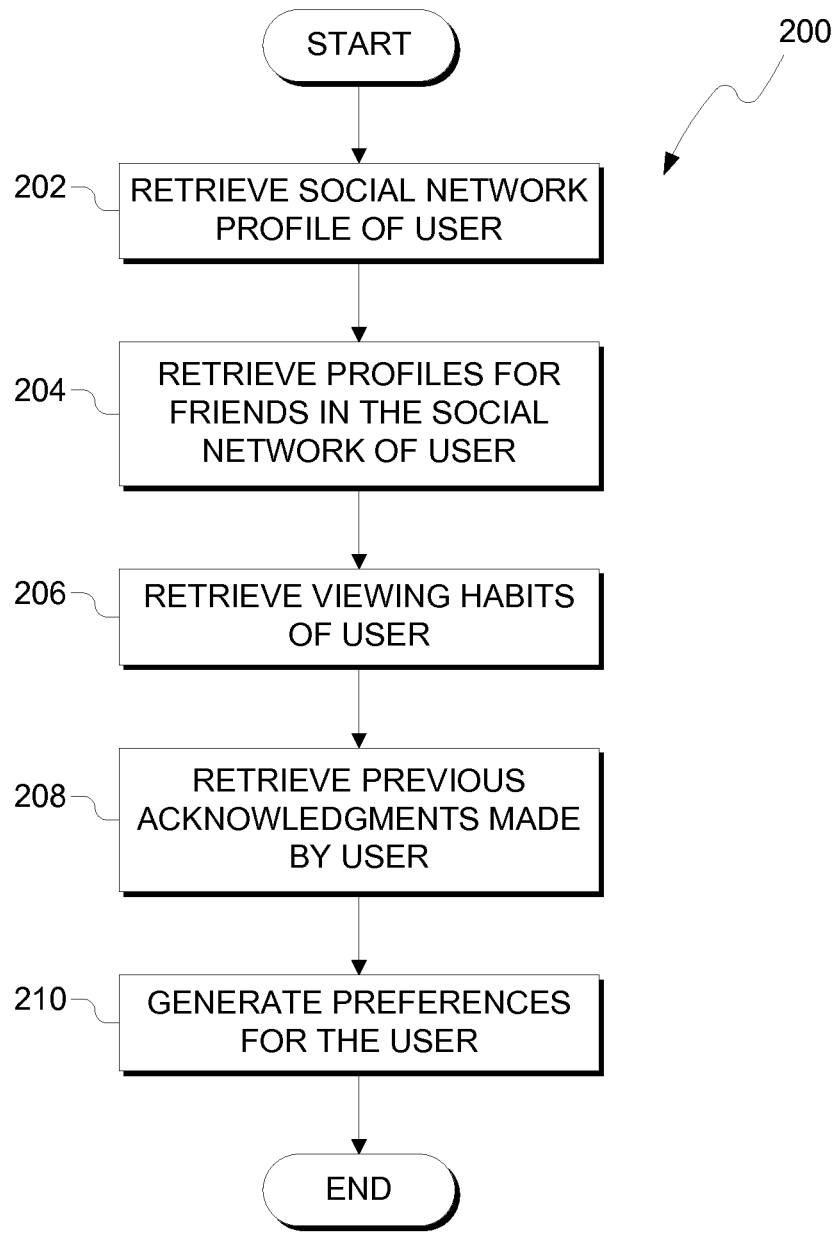
FIG. 2 illustrates operational processes of an overlay program generating a preference profile, on a computing device within the environment of FIG. 1, in accordance with an embodiment of the present invention.

FIG. 2 illustrates operational processes, generally designated 200, of overlay program 124 generating a preference profile. Overlay program 124 generates preferences for profiles of users of computing device 120. The preferences for each profile indicate the type of content, and other factors a user associated with the profile, typically enjoyed for viewing by the user. In process 202, overlay program 124 retrieves information from a social network profile from a social network platform (not shown). For example, overlay program 124 retrieves one or more of the following from the social network: the user's age or birth date; the user's current home location; the user's birth location or previous places of residence; groups the user follows; and messages posted to the social network made by the user. In some scenarios, overlay program 124 generates certain preferences based on the current location or previous locations the user lived. For example, overlay program 124 creates a preference for a team located near the user's hometown. In other scenarios, overlay program 124 generates certain preferences based on the user's posts or groups the user follows. For example, overlay program 124 analyzes the content of the user's posts or descriptions of group the user follows to determine interests of the user. Overlay program 124 generates preferences based on the determined interests.

In process 204, overlay program 124 retrieves the social network profiles for friends of the user. Example information retrieved for each friend of the user in the social network includes, but is not limited to, one or more of the following: the friend's age or birth date; the friend's current home location; the friend's birth location or previous places of residence; groups the friend follows; and messages posted to the social network made by the friend. In some scenarios, overlay program 124 aggregates the information gathered from each friend's profile to determine any trends or common interests among the friends of the user. For example, if a certain percentage of friends are currently living in a location, then overlay program 124 determines the location is of interest to the user and generates preferences for video content about the area (e.g., news reports of the location or sports teams from the location). In other scenarios, overlay program 124 generates certain preferences based on the posts made by friends of the user. Overlay program 124 analyzes the content of the friends' posts to determine common topics among the various posts. If the number of posts from friends of a user about a topic exceed a threshold value or percentage, then overlay program 124 generates preferences based on the topic. For example, if over three-fourths of the friends for a user post social network messages about a show, then overlay program 124 generates a preference for the show for the user.

In process 206, overlay program 124 retrieves the viewing habits of the user from profile data 126. As a user views video data 114 from content provider 110, overlay program 124 stores respective content data 116 regarding the video data 114 when viewed by the user via video player program 122. In some scenarios, overlay program 124 stores content data 116 in a user's profile describing the content of the video being displayed (e.g., metadata of the content such as, genre and actors in a movie or teams and game being played). In other scenarios, overlay program 124 stores the length of time a respective video data 114 or type of content data 116 has been viewed by the user. For example, overlay program 124 stores how long a particular piece of video content has been viewed. As another scenario, overlay program 124 stores how long a type of content has been viewed by the user (e.g., a user has watched a cumulative of twenty hours of comedies or two hundred hours of movies with an particular actor). In some embodiments, overlay program 124 represents viewing habits as a distribution of weights among one or more types of content data 116. For example, a user has one-hundred hours of time viewing various different videos via video player program 122 and twenty hours are spent watching sports games, thirty hours watching comedies, and fifty hours watching mysteries. Overlay program 124 assigns respective weights of 20% to sports, 30% to comedies, and 50% to mysteries. In some embodiments, profile data 126 includes a record of all viewing habits of a user. In other embodiments, profile data 126 includes a pre-determined record of viewing habits of the user (e.g., the last three months of viewing habits).

In process 208, overlay program 124 retrieves previous acknowledgements of the user to prior PIP overlays displayed by overlay program 124. When overlay program 124 displays a PIP overlay to a user, overlay program 124 stores the acknowledgment from the user to the PIP overlay. Furthermore, overlay program 124 stores the content data 116 of the respective video data 114 indicated in the PIP overlay when responded to by the user. Overlay program 124 stores whether the user acknowledges the PIP overlay. In some scenarios, overlay program 124 stores positive acknowledgements of a PIP overlay. For example, a user selects video data 114 associated with a PIP overlay to view, such an action is considered by overlay program 124 as a positive acknowledgment. In other scenarios, after some time has passed (e.g., thirty seconds) if a user does not acknowledge the PIP overlay, overlay program 124 considers to lack of response a negative acknowledgement of the PIP overlay. As such, overlay program 124 stores the content data 116 of the suggested video data 114 that was not acknowledged. In some scenarios, positive acknowledgments increase a score associated with the preferences stored in profile data 126 for a user for the types of content data 116 of the suggested video data 114 that was accepted by the user. Negative acknowledgments decrease a score associated with the preferences stored in profile data 126 for a user for the types of content data 116 of the suggested video data 114 that was rejected by the user.

In some embodiments, overlay program 124 determines acknowledgements to PIP overlays based on captured image data from camera device 128. Based on the captured images, overlay program 124 determines the location of a display a user is watching via eye tracking image processing. If a user quickly glances at a PIP overlay (e.g., less than a second), then overlay program 124 determines the user has negatively acknowledged the video data 114 displayed in the PIP overlay and, as such, assigns a negative acknowledgment to the content of the video data 114 in the PIP overlay. On the other hand, if a user looks at a PIP overlay for a longer period of time (e.g., for more than a second), then overlay program 124 determines the user has positively acknowledged the video data 114 displayed in the PIP overlay and, as such, assigns a positive acknowledgment to the content of the video data 114 in the PIP overlay.

In process 210, overlay program 124 updates preferences for the user viewing video data 114 on video player program 122. Overlay program 124 retrieves social network information (process 202 and 204), viewing habits (process 206) and previous acknowledgment responses (process 208) to update preferences for a user. In some embodiments, overlay program 124 performs processes 202, 204, 206 and 208 at certain intervals (e.g., daily) or events (e.g., when a user begins viewing video data 114). In other embodiments, overlay program 124 performs processes 202, 204, 206 and 208 independently and at different times or events. For example, overlay program 124 retrieves social network information (processes 202 and 204) when new information is available (e.g., a new message is posted by the user). In some embodiments, overlay program 124 updates preferences for the user viewing video data 114 when new information is retrieved in one or more of processes 202, 204, 206 or 208. For example, new viewing habits have been stored in profile data 126, but social network information remains the same. In such embodiments, overlay program 124 updates preferences for a user when relevant profile data 126 (e.g., the profile of the user) is updated. In various embodiments, profile data 126 includes preferences for a user. Preference indicate types of content, determined by overlay program 124, that the user is predicted to enjoy. In some embodiments, preferences include a list of content the user would enjoy, such as favorite actors, teams, genres and the like. If video data 114 is currently available with one or more of the preferences of the user, then overlay program 124 generates a PIP overlay displaying the particular matching video data 114 as a picture-in-picture format over the currently displayed video data 114. In other embodiments, preferences include a score for each type of content. In some scenarios, the higher the score indicates a higher preference by the user for that type of content.

Figure 3A:
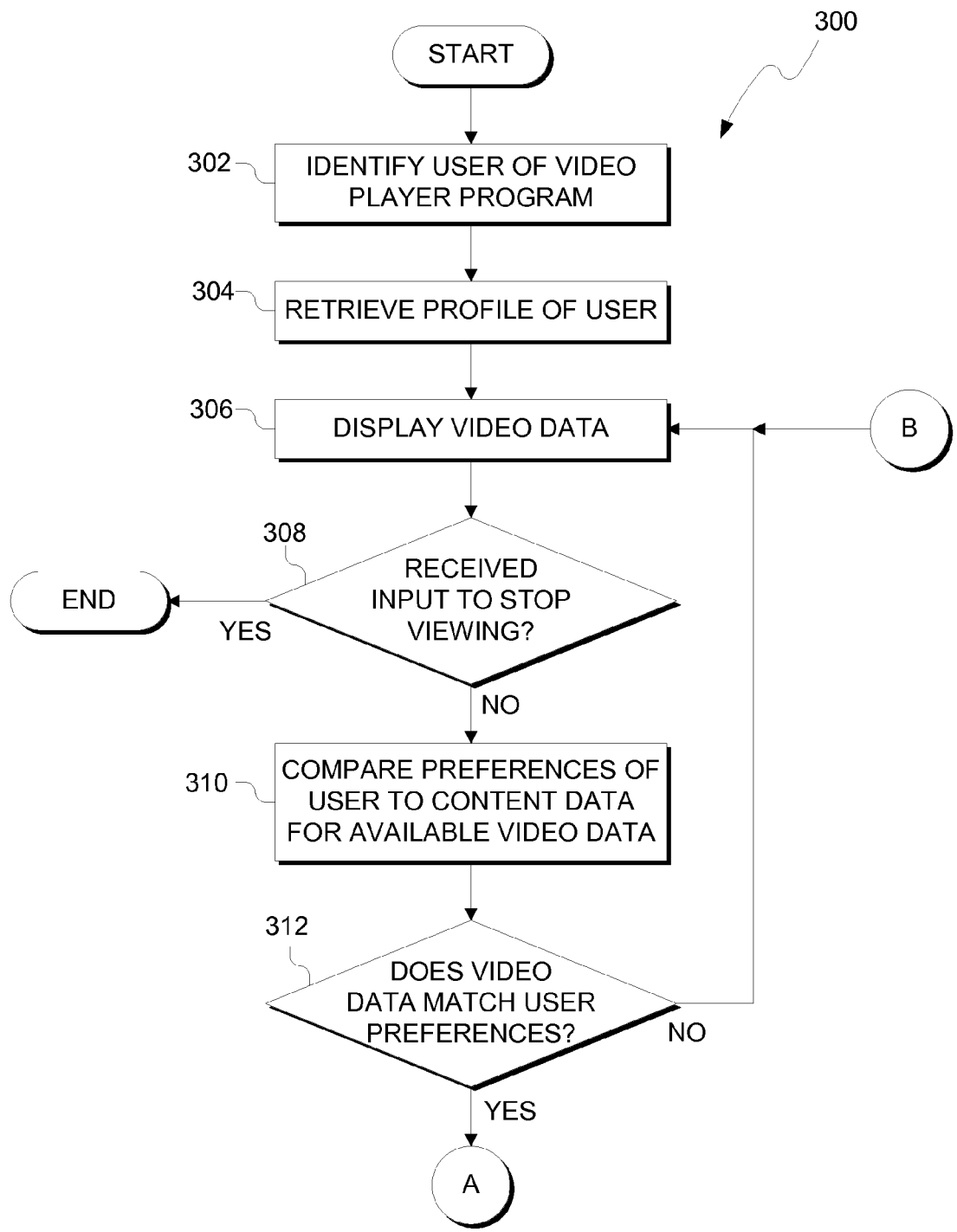
FIGS. 3A & 3B illustrate operational processes of an overlay program displaying picture-in-picture overlays of video content, on a computing device within the environment of FIG. 1, in accordance with an embodiment of the present invention.
Figure 3B:
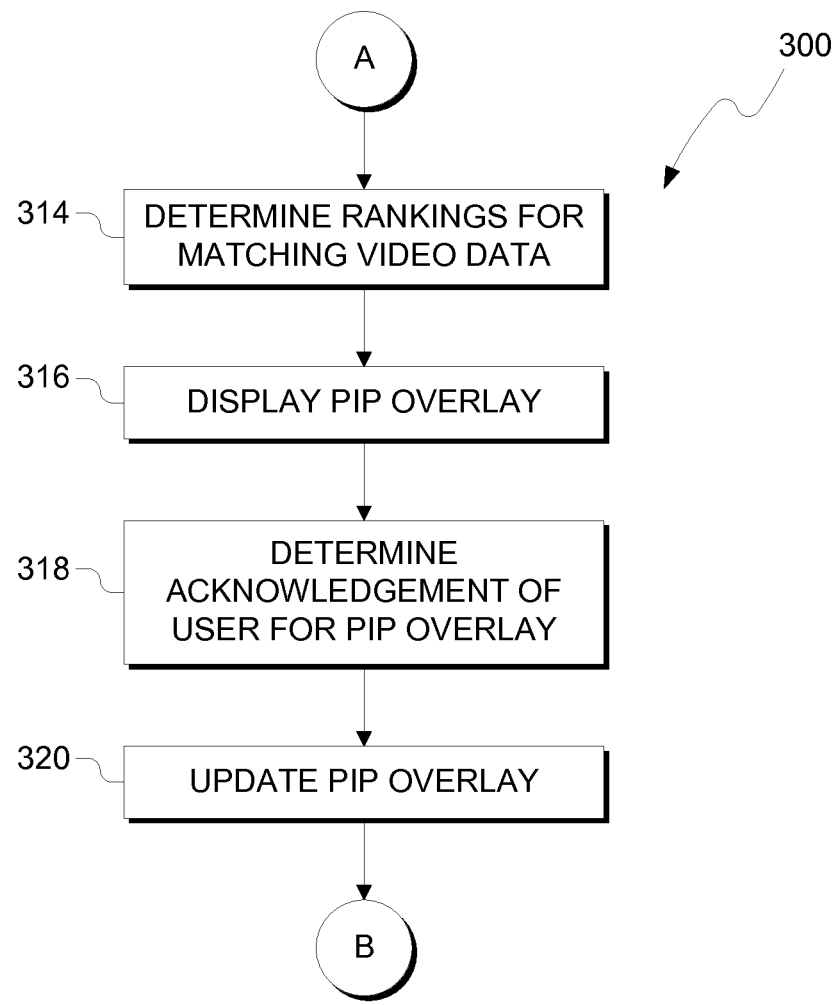

FIGS. 3A-3B illustrates operational processes, generally designated 300, of overlay program 124 displaying picture-in-picture overlays of video content. In process 302, overlay program 124 identifies the identity of the user of video player program 122. In some embodiments, video player program 122 receives authentication information (e.g., a username and password) to access video data 114. Overlay program 124 receives the authentication information from video player program 122. Based on the authentication information, overlay program 124 determines the respective profile in profile data 126. In other embodiments, computing device 120 captures images of a user via camera device 128. Overlay program 124 receives images of users of computing device 120. Profile data 126 includes a face image profile for each user. As such, overlay program 124 compares received images from the camera to the images associated with each profile to identify the user of video player program 122. In an embodiment, overlay program 124 identifies more than one user of video player program 122. For example, computing device 120 is a smart TV with an attached camera device 128. Overlay program 124 receives one or more images including all current users viewing the smart TV. For each users included in the one or more images, overlay program 124 identifies the identities of each user.

In process 304, overlay program 124 retrieves the profile of the identified user from profile data 126. In various embodiments, overlay program 124 retrieves the viewing preferences of the user associated with the profile. In process 306, video player program 122 displays a video or stream from video data 114. As a user watches a video on computing device 120, overlay program 124 compares the retrieved viewing preferences of the user to content data 116 of other videos or streams currently available for viewing in video data 114 (process 310). While a user views a video or stream of video data 114, video player program 122 receives a variety of commands from the user to control the video data 114 displayed by video player program 122. For example, computing device 120 is a smart TV. Video player program 122 receives an input command from the user to change the current stream of video data 114 to another stream (e.g., change channels). As another example, video player program 122 receives an input command from the user to change the current video (e.g., an on-demand video of content provider 110) of video data 114 to a live stream of video in video data 114. One of ordinary skill will appreciate that a PIP overlay displayed by overlay program 124 can occur at any state or mode of operation of video player program 122.

In process 308, video player program 122 determines if a command is received to stop viewing of video data 114. For example, a stop command may be a stop video command a power off command for computing device 120, or an exit application command for video player program 122. If a stop command is received (YES branch of process 308), then video player program 122 stops the display of video data 114. If not stop command is received (NO branch of process 308), then video player program 122 continues operation awaiting either commands from the user (e.g., as discussed herein with regards to process 306) or from overlay program 124 (e.g., as discussed herein with regards to process 320). In some embodiments, video player program 122 is currently not operating (e.g., is not currently displaying video data 114). In such embodiments, a user is not near computing device 120. However, the user is in proximity to mobile device 130. Notification program 132 receives messages from overlay program 124 when matching events or content is available in video data 114 (e.g., a favorite baseball player is up to bat). Notification program 132 displays the message to the user of mobile device 130, alerting the user of the available content or event. In some scenarios, mobile device includes a video player program to view the available video data 114 matching the user's preferences.

In process 310, overlay program 124 compares the viewing preferences of the user to content data 116 of available video data 114 of content provider 110. Viewing preferences include various topics, situations, or other descriptors that a user finds interesting or prefers viewing. In some embodiments, overlay program 124 determines viewing preferences of the users based on social network information, viewing habits, and previous responses to PIP overlays generated by overlay program 124. In other embodiments, overlay program 124 receives user-designated preferences from the user. In various embodiments, overlay program 124 determines if any of the respective content data 116 of available video data 114 matches the viewing preferences of the user (process 312). If content data 116 of a video or stream of video data 114 matches one or more preferences of the user (YES branch of process 312), then overlay program 124 determines a ranking score for the matching video data 114 (process 314). In no content data 116 of the available video data 114 matches the preferences of a user (NO branch of process 312), then video player program 122 continues displaying the selected video data 114 (process 306) and overlay program 124 continues comparing content data 116 of available video data 114 until either a stop command is received (YES branch of process 308) or an PIP overlay is displayed (process 316).

In process 314, overlay program 124 determines a ranking for each available video data 114 with receptive content date 116 that matched a preference of the user. Based on the score of a preference in a profile of the user, overlay program 124 assigns a rank to the video data 114. For example, video data 114 includes various broadcasts of television channels. Of the available channels, only two are providing content that match preferences of the user, as indicated in a profile in profile data 126. Of the two channels, an action movie is on one channel and sporting game is on another. The profile includes a score for each type of content preference. In this example, the profile includes a higher score for sporting than for action movies. As such, overlay program 124 assigns a higher rank to the video data 114 (e.g., the channel) with the sporting game than the video data 114 with the action movie. In some scenarios, video data 114 has more than one content that matches that matches the preferences of the user. Using the above example again, the movie also includes an actor that has a high preference score. In one instance, overlay program 124 adds the preference scores off each type of content in video data 114 that is included in a profile of the user. In this example, the included actor increases the total preference score above that of sporting for the user and, as such, is ranked higher. In some scenarios, some preferences in a profile have a negative preference score, indicating disliked content. In an instance of a negative preference score, when combined with a content with a positive preference score, the result lowers the ranking score of the particular video data 114.

In process 316, overlay program 124 displays a PIP overlay on top of the currently viewed video data 114. Based on the ranking scores determined in process 314, overlay program 124 displays one or more PIP overlays of video data 114 from streams or videos with content matching viewing preferences of the user. Overlay program 124 displays the highest ranking video data 114 from other channels or on-demand video. In some scenarios, overlay program 124 displays more than one channel or video in the PIP overlay in an order (e.g., left to right or top to bottom) based on the ranking score (e.g., highest ranking video data 114 on the left). In some scenarios, displayed video data 114 in the PIP overlay is a current or live broadcast of the matching video data 114. In scenarios where a particular event matched preferences of the user, the displayed video data 114 in the PIP overlay is delayed and starts before or at the timing of the event in video data 114.

Figure 4:
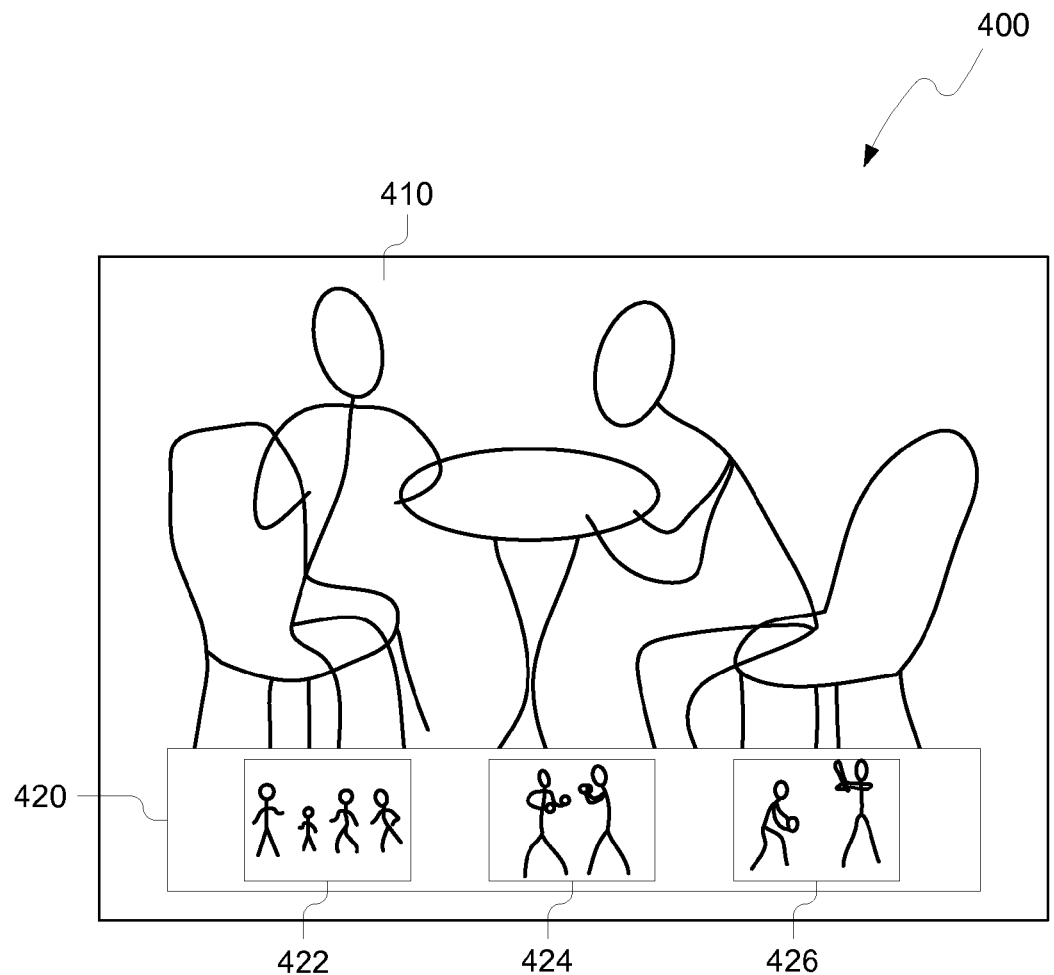
FIG. 4 depicts an illustrative example of a picture-in-picture view, in accordance with an embodiment of the present invention.

FIG. 4 depicts an illustrative example of PIP view 400. PIP view 400 includes main view 410. Main view 410 depicts the currently viewed video data 114 a user is watching. As a user watches content in main view 410, overlay program 124 checks for other video data 114 that matches preferences of the user viewing the content in main view 410. When respective content data 116 indicates video data 114 is available or currently being broadcasted that matches the preferences of the user, overplay program 124 displays PIP overlay 420. In this example, PIP overlay 420 includes a display of video data 114 that matches content data 116 to preferences of the user as video previews 422, 424 and 426. In some scenarios, video previews 422, 424 or 426 display live or current broadcasts of video data 114. In other scenarios, video previews 422, 424 or 426 display delayed video previews. For example, if an event caused the matching of content data 116 to preferences of the user, the video preview is delayed so that the event is displayed in the video preview. In this example, PIP overlay 420 includes three previews. One of ordinary skill in the art will appreciate that any number of previews is displayed without deviating from the invention. Furthermore, not video data 114 displayed in PIP overlay 420 as a preview is limited based on or more predetermined threshold based on the determined ranking score in process 314. If the ranking score is below a certain value, then the preview for the particular video data 114 is not displayed in PIP overlay 420.

Continuing now with FIG. 3B, in process 318, overlay program 124 determines the user's acknowledgment of the PIP overlay. In some scenarios, overlay program 124 receives input via an input device to acknowledge the PIP overlay. For example, computing device 120 is communicatively coupled to a remote device to change channels and the acknowledge the PIP overlay. A user can provide commands to accept the PIP overlay and change the main view of computing device to the channel or video indicated in the PIP overlay (i.e., a positive acknowledgement). A user also provide commands to dismiss the PIP overlay continue watching the video displayed in the main view (i.e., a negative acknowledgement).

In other scenarios and embodiments, overlay program 124 is configured to track eye movements of the user by analyzing images captured by camera device 128 of the user. Based on the eye movements of the user, overlay program 124 determines the location and amount of time a user views the display of computing device 120. Referring to FIG. 4, PIP view 400 represent the display of computing device 120 with a main view 410. In this example, overlay program 124 generates PIP overlay 420 in a bottom location of main view 410. The bottom location is broken into three parts for each preview 422, 424 and 426. When overlay program 124 displays a PIP overlay (process 316), then overlay program 124 tracks the eye movements of the user. In one instance, a user does not acknowledge any of the previews 422-426 and keeps visual attention to main view 410. If after some time (e.g., five seconds) a user does not view any of the previews, then overlay program 124 determines the acknowledgement to be negative and all previews 422-426 are removed in addition to PIP overlay 420.

In another instance, a user views one preview (e.g., preview 424) for an amount of time. Based on the eye movements of the user, overlay program 124 determines the user is viewing the area of PIP view 400 where preview 424 is located. If the user quickly looks at preview 424 (e.g., less a few seconds), then overlay program 124 determines the acknowledgment of preview 424 to be negative. In response, overlay program removes preview 424 from PIP overlay 420. If other lower ranked video data 114 is available, then overlay program 124 updates PIP overlay 420 with a preview of the video data. If preview 426 is higher ranked then the new preview, overlay program 124 moves preview 426 to the left in PIP overlay (e.g., in the position of preview 424) to reflect the current rankings of the previews. If a user views a preview for a longer period of time (e.g., more than two seconds), then overlay program 124 determines the longer time of viewing the preview as a positive acknowledgment of the video data 114 displayed in the preview. In one instance, overlay program 124 switches main view 410 with the preview the user viewed for the longer period of time. For example, if a user has been looking at preview 422 for five seconds, then overlay program 124 sends commands to video player program to switch main view 410 with video data 114 displayed in preview 422, while overlay program 124 updates preview 422 with video data 114 displayed in main view 410. One of ordinary skill in the art will appreciate the durations of viewing areas of PIP view 400 and determining positive and negative acknowledgments vary to accommodate different users without deviating from the invention.

Continuing now with FIG. 3B, in process 320, overlay program 124 updates the PIP overlay. For scenarios where the user does not acknowledge the PIP overlay after a predetermined amount of time, then overlay program 124 removes the PIP overlay from display. In such instances, overlay program 124 waits for some amount of pre-determined time (e.g., five minutes, half an hour, etc.) before displaying a new PIP overlay (process 316). For scenarios where a user negatively acknowledges a preview in PIP overlay, overlay program 124 updates the preview with a new stream, broadcast or video from video data 114 that matches preferences of the user. This stream or video has a lower rank as determined in process 314 but still matches one or more preferences of the user, providing more relevant suggestions. For scenarios where a user positively acknowledges a preview in the PIP overlay, overlay program 124 sends a command to video player program 124 to switch displayed video with the preview. In some instances, overlay program 124 keeps the PIP overlay displayed so that a user can switch back to the originally displayed video data 114. In other instances, overlay program 124 removes the PIP overlay from display after the switch.

In some embodiments and scenarios, overlay program 124 is configured to monitor available video data 114 and the respective content data 116 for events or content that matches preferences of the user. In some embodiments and scenarios, when matches occur, overlay program 124 is configured to generate a PIP overlay showing a preview of the matching video. In some embodiments and scenarios, overplay program 124 only generates a PIP overlay after some time has passed since the last PIP overlay has been displayed. In some embodiments and scenarios, based on the acknowledgements of the user, either through input devices or eye tracking, overlay program 124 is configured to determine when to display a PIP overlay. In some embodiments and scenarios, if a user negatively acknowledges one or all previews in a PIP overlay, then overlay program 124 is configured to wait for a longer period to display another PIP overlay than if a user positively acknowledges a preview in a PIP overlay. In other scenarios, if it is determined that a video in video data 114 has a higher ranking score than the current content being watched by a user, then overlay program 124 displays the PIP overlay for the video regardless of previous acknowledgements.

Figure 5:
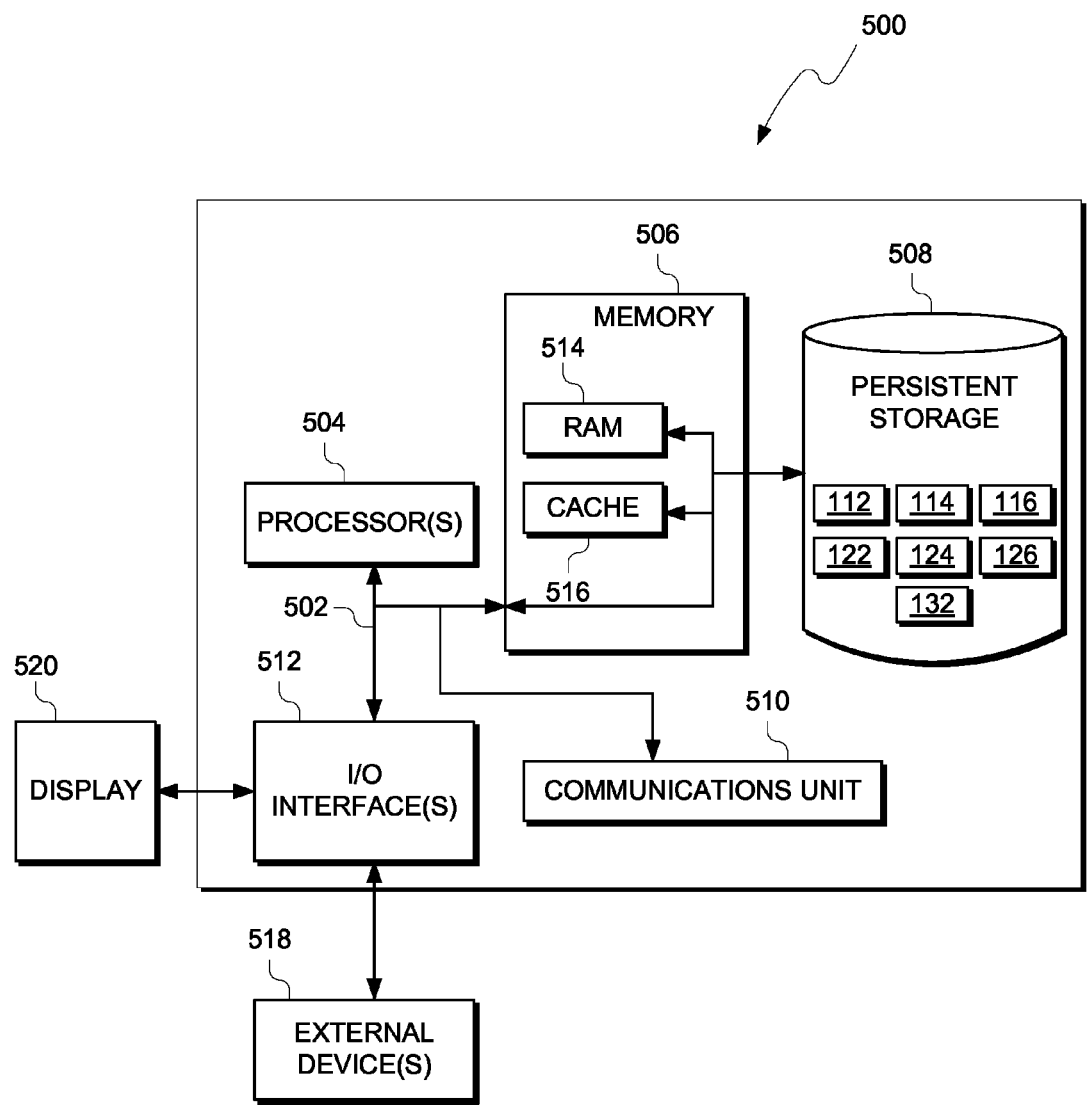
FIG. 5 depicts a block diagram of components of the computing device or mobile device executing a video distribution program, a video player program, an overlay program, or an notification program in accordance with an embodiment of the present invention.

FIG. 5 depicts a block diagram, 500, of components for each of content provider 110, computing device 120, and mobile device 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Content provider 110, computing device 120, and mobile device 130 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Video distribution program 112, video data 114, content data 116, video player program 122, overlay program 124, profile data 126, and notification program 132 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. Video distribution program 112, video data 114, content data 116, video player program 122, overlay program 124, profile data 126, and notification program 132 may be downloaded to persistent storage 508 through communications unit 510.

I/O interface(s) 512 allows for input and output of data with other devices that may be connected to one or both of content provider 110, computing device 120, and mobile device 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., video distribution program 112, video data 114, content data 116, video player program 122, overlay program 124, profile data 126, and notification program 132 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of comprising:
   identifying, by one or more processors, an identity of a viewer of a display device, wherein the display device is displaying a first video feed;
   retrieving, by the one or more processors, a profile of the viewer, wherein the profile includes a plurality of preferences of the viewer;
   retrieving, by the one or more processors, one or more messages from at least one contact of a social network associated with the viewer;
   determining, by the one or more processors, a content of the one or more messages from the at least one contact;
   updating, by the one or more processors, the plurality of preferences of the viewer based, at least in part, on the content of the one or more messages from the at least one contact;
   responsive to a determination that a content of a second video feed that is available for viewing on the display device matches at least one of the plurality of preferences of the viewer, displaying, by the one or more processors, an overlay of the second video feed on top of the first video feed;
   identifying, by the one or more processors, an acknowledgment made by the user regarding the overlay;
   receiving, by the one or more processors, a plurality of images of the user;
   determining, by the one or more processors, an amount of time the user has viewed a portion of the display device based, at least in part, on the plurality of images of the user, wherein the acknowledgment is based, at least in part, on the amount of time the user has viewed the portion of the display device;
   updating, by the one or more processors, the overlay based, at least in part on, the acknowledgment made by the user;
   identifying, by the one or more processors, a negative acknowledgment based, at least in part, on the amount of time the user has viewed the portion of the display device, wherein the amount of time is below a predetermined amount; and
   responsive to identifying the negative acknowledgment, updating, by the one or more processors, the at least one of the plurality of preferences of the viewer that matches the content of the second video feed, wherein a score associated with the least one of the plurality of preferences of the viewer that matches the content of the second video feed is decreased.

2. The method of claim 1, the method further comprising:
   determining, by the one or more processors, a third video feed that is available for viewing on the display device matches at least one of the plurality of preferences of the viewer;
   determining, by the one or more processors, a first ranking score for the second video feed;
   determining, by the one or more processors, a second ranking score for the third video feed; and
   displaying, by the one or more processors, the overlay including the second video feed and the third video feed on top of the first video feed, wherein the first ranking score and the second ranking score are both above a predetermined value.

3. The method of claim 2, the method further comprising:
   responsive to the first ranking score being larger than the second ranking score, displaying, by the one or more processors, the second video feed before the third video feed in the overlay.

4. The method of claim 1, the method further comprising:
responsive to identifying the negative acknowledgment, updating, by the one or more processors, the overlay of with a third video feed, wherein the third video feed matches at least one of the plurality of preferences of the viewer.

5. The method of claim 1, the method further comprising:
identifying, by the one or more processors, a positive acknowledgment based, at least in part, on the amount of time the user has viewed the portion of the display device, wherein the amount of time is above a predetermined amount, wherein the portion of the display device corresponds to an area of the display device where the second video feed is displayed.

6. A computer program product comprising:
one or more computer-readable storage media and program instructions stored on the one or more computer-readable storage media, the program instructions comprising:
   program instructions to identify an identity of a viewer of a display device, wherein the display device is displaying a first video feed;
   program instructions to retrieve a profile of the viewer, wherein the profile includes a plurality of preferences of the viewer;
   program instructions to retrieve one or more messages from at least one contact of a social network associated with the viewer;
   program instructions to determine a content of the one or more messages from the at least one contact;
   program instructions to update the plurality of preferences of the viewer based, at least in part, on the content of the one or more messages from the at least one contact;
   responsive to a determination that a content of a second video feed that is available for viewing on the display device matches at least one of the plurality of preferences of the viewer, program instructions to display an overlay of the second video feed on top of the first video feed;
   program instructions to identify an acknowledgment made by the user regarding the overlay;
   program instructions to receive a plurality of images of the user;
   program instructions to determine an amount of time the user has viewed a portion of the display device based, at least in part, on the plurality of images of the user, wherein the acknowledgment is based, at least in part, on the amount of time the user has viewed the portion of the display device;
   program instructions to update the overlay based, at least in part on, the acknowledgment made by the user;
   program instructions to identify a negative acknowledgment based, at least in part, on the amount of time the user has viewed the portion of the display device, wherein the amount of time is below a predetermined amount; and
   responsive to identifying the negative acknowledgment, program instructions to update the at least one of the plurality of preferences of the viewer that matches the content of the second video feed, wherein a score associated with the least one of the plurality of preferences of the viewer that matches the content of the second video feed is decreased.

7. The computer program product of claim 6, the program instructions further comprising:
   program instructions to determine a third video feed that is available for viewing on the display device matches at least one of the plurality of preferences of the viewer;
   program instructions to determine a first ranking score for the second video feed;
   program instructions to determine a second ranking score for the third video feed; and
   program instructions to display the overlay including the second video feed and the third video feed on top of the first video feed, wherein the first ranking score and the second ranking score are both above a predetermined value.

8. The computer program product of claim 7, the program instructions further comprising:
   responsive to the first ranking score being larger than the second ranking score, program instructions to display the second video feed before the third video feed in the overlay.

9. The computer program product of claim 6, the program instructions further comprising:
   responsive to identifying the negative acknowledgment, program instructions to update the overlay of with a third video feed, wherein the third video feed matches at least one of the plurality of preferences of the viewer.

10. The computer program product of claim 6, the program instructions further comprising:
    program instructions to identify a positive acknowledgment based, at least in part, on the amount of time the user has viewed the portion of the display device, wherein the amount of time is above a predetermined amount, wherein the portion of the display device corresponds to an area of the display device where the second video feed is displayed.

11. A computer system comprising:
one or more computer processors;
one or more computer readable storage media; and
program instructions stored on the computer readable storage media for execution by at least one of the one or more processors, the program instructions comprising:
   program instructions to identify an identity of a viewer of a display device, wherein the display device is displaying a first video feed;
   program instructions to retrieve a profile of the viewer, wherein the profile includes a plurality of preferences of the viewer;
   program instructions to retrieve one or more messages from at least one contact of a social network associated with the viewer;
   program instructions to determine a content of the one or more messages from the at least one contact;
   program instructions to update the plurality of preferences of the viewer based, at least in part, on the content of the one or more messages from the at least one contact;
   responsive to a determination that a content of a second video feed that is available for viewing on the display device matches at least one of the plurality of preferences of the viewer, program instructions to display an overlay of the second video feed on top of the first video feed;
   program instructions to identify an acknowledgment made by the user regarding the overlay;
   program instructions to receive a plurality of images of the user;
   program instructions to determine an amount of time the user has viewed a portion of the display device based, at least in part, on the plurality of images of the user, wherein the acknowledgment is based, at least in part, on the amount of time the user has viewed the portion of the display device;

program instructions to update the overlay based, at least in part on, the acknowledgment made by the user;

program instructions to identify a negative acknowledgment based, at least in part, on the amount of time the user has viewed the portion of the display device, wherein the amount of time is below a predetermined amount; and responsive to identifying the negative acknowledgment, program instructions to update the at least one of the plurality of preferences of the viewer that matches the content of the second video feed, wherein a score associated with the least one of the plurality of preferences of the viewer that matches the content of the second video feed is decreased.

12. The computer system of claim 11, the program instructions further comprising:

program instructions to determine a third video feed that is available for viewing on the display device matches at least one of the plurality of preferences of the viewer;

program instructions to determine a first ranking score for the second video feed;

program instructions to determine a second ranking score for the third video feed; and program instructions to display the overlay including the second video feed and the third video feed on top of the first video feed, wherein the first ranking score and the second ranking score are both above a predetermined value.

13. The computer system of claim 12, the program instructions further comprising:

responsive to the first ranking score being larger than the second ranking score, program instructions to display the second video feed before the third video feed in the overlay.

14. The computer system of claim 11, the program instructions further comprising:

responsive to identifying the negative acknowledgment, program instructions to update the overlay of with a third video feed, wherein the third video feed matches at least one of the plurality of preferences of the viewer.

* * * * *